United States Patent
Wang et al.

(10) Patent No.: US 8,856,251 B2
(45) Date of Patent: Oct. 7, 2014

(54) PICTURE PROCESSING METHOD AND APPARATUS FOR INSTANT COMMUNICATION TOOL

(75) Inventors: Chunpeng Wang, Guangdong (CN); Huanyu Zhou, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 230 days.

(21) Appl. No.: 13/509,423

(22) PCT Filed: Jan. 5, 2011

(86) PCT No.: PCT/CN2011/070037
§ 371 (c)(1),
(2), (4) Date: May 11, 2012

(87) PCT Pub. No.: WO2011/088756
PCT Pub. Date: Jul. 28, 2011

(65) Prior Publication Data
US 2012/0233281 A1 Sep. 13, 2012

(30) Foreign Application Priority Data
Jan. 22, 2010 (CN) .......................... 2010 1 0102719

(51) Int. Cl.
*G06F 15/16* (2006.01)
*G06F 3/0484* (2013.01)

(52) U.S. Cl.
CPC ................................. *G06F 3/04845* (2013.01)
USPC ........ 709/206; 709/224; 370/354; 455/550.1; 455/575.1; 705/14.66

(58) Field of Classification Search
None
See application file for complete search history.

(56) References Cited

U.S. PATENT DOCUMENTS

| 5,671,346 A | 9/1997 | Tamura et al. |
| 6,034,685 A | 3/2000 | Kuriyama et al. |
| 2004/0228532 A1 | 11/2004 | Fernandez et al. |
| 2005/0163379 A1* | 7/2005 | Zimmermann ............... 382/190 |

(Continued)

FOREIGN PATENT DOCUMENTS

| CN | 101075172 | 11/2007 |
| CN | 101075172 A | 11/2007 |
| CN | 101078980 A | 11/2007 |

OTHER PUBLICATIONS

International Search Report issued in PCT/CN2011/070037, Apr. 14, 2011, 2 pages.

(Continued)

*Primary Examiner* — Mohamed Ibrahim
(74) *Attorney, Agent, or Firm* — Bacon & Thomas, PLLC

(57) ABSTRACT

A method and an apparatus for processing a picture of an instant messenger are disclosed, which belong to the field of computers comprising: obtaining related information of an edit region, wherein the related information comprises at least a horizontal coordinate range and a vertical coordinate range; obtaining and recording position information of an initial cursor when a start notice is received, wherein the position information comprises at least coordinates; and obtaining position information of a current cursor in real time, generating a line segment according to the position information of the current cursor, the recorded position information and the related information, and updating the recorded position information into the position information of the current cursor. The apparatus comprises a first obtaining module, a second obtaining module and a generation module. The present disclosure can draw a line according to the movement path of the cursor.

15 Claims, 5 Drawing Sheets

(56) References Cited

U.S. PATENT DOCUMENTS

2006/0075054 A1* 4/2006 Zhang et al. .................. 709/206
2008/0049107 A1* 2/2008 Hii et al. .................... 348/207.1
2010/0067674 A1* 3/2010 Lee .......................... 379/100.01

OTHER PUBLICATIONS

Notification of First Office Action dated Nov. 22, 2013 in corresponding Russian application.
Notification of Canadian First Office Action dated Feb. 11, 2014.

* cited by examiner

PICTURE PROCESSING METHOD AND APPARATUS FOR INSTANT COMMUNICATION TOOL

CROSS-REFERENCE TO RELATED APPLICATIONS

This is the national stage of PCTCN0211/070037, filed May 1, 2011, which claims the benefit of priority to Chinese application no. 201010102719.8 filed Jan. 22, 2010, the entire contents of which is incorporated by reference herein in its entirety.

FIELD OF THE INVENTION

The present disclosure relates to the field of computers, and more particularly, to a method and an apparatus for processing a picture for an instant communication tool (also referred to as messenger).

BACKGROUND OF THE INVENTION

With the rapid development of the Internet technologies, instant messengers have found wide applications. Users often use the instant messengers to send a large number of pictures. Some of these pictures need to be processed by the users before being sent out.

The existing instant messengers have a screenshot function and an edit function. The users may capture a picture by using the screenshot function and then process the picture by using the edit function, for example, add contents to the captured picture or dash out some contents of the picture. Drawing a line in the picture is one way of the picture processing. The existing edit function draws a line in the picture in the following way. When a main mouse button is pressed down, the edit function obtains a position of a cursor as a start position. Then, a user may move the mouse, and the cursor moves following the mouse until the user releases the main mouse button. As a result, a straight line between a position at which the cursor is located when the main mouse button is released and the start position is drawn by the edit function.

In the process of implementing the present disclosure, the inventor found at least the following problem with the prior art: the existing edit function can only draw a straight line between the start position at which the cursor is located when the main mouse button is pressed down and the position at which the cursor is located when the main mouse button is released, but cannot draw a line according to the actual movement path of the cursor. If the user needs to edit a curve, then he must press down, move and then release the mouse continuously or use other graph processing software for editing purpose. The former editing manner is complicated, and the curve thus edited is unsatisfactory due to a low smoothness. The latter editing manner needs to perform a series of complicated operations such as firstly storing the picture captured by the screenshot function of the instant communication software, opening and then editing the stored picture by using the graph processing software, and then storing the picture edited.

SUMMARY OF THE INVENTION

In order to make it convenient for the user to draw a line according to the actual movement path of the cursor, the present disclosure provides a method and an apparatus for processing a picture for an instant messenger.

Specifically, the present disclosure provides a method for processing a picture for an instant messenger, characterized in that the method comprises the following steps of: obtaining related information of an edit area captured by the instant messenger, wherein the related information comprises at least an abscissa range and an ordinate range; and obtaining and recording position information of a cursor in real time after a start notification is received and before an end notification is received, and generating a line segment according to position information of a current cursor, the recorded position information of a previous cursor and the related information of the edit area.

Wherein, the line segment is generated within the edit area between the current cursor and the previous cursor according to the position information of the current cursor, the recorded position information of the previous cursor and the related information of the edit area.

In addition, the present disclosure further provides an apparatus for processing a picture for an instant messenger, characterized in that the method comprises: a first obtaining module, being configured to obtain related information of an edit area, wherein the related information comprises at least an abscissa range and an ordinate range; a second obtaining module, being configured to obtain and record position information of a cursor in real time after a start notification is received and before an end notification is received; and a generation module, being configured to generate a line segment according to position information of a current cursor and the recorded position information of a previous cursor that are obtained by the second obtaining module and the related information of the edit area obtained by the first obtaining module.

Wherein, the generation module is configured to generate the line segment within the edit area between the current cursor and the previous cursor according to the position information of the current cursor and the recorded position information of the previous cursor that are obtained by the second obtaining module and the related information of the edit area obtained by the first obtaining module.

DETAILED DESCRIPTION OF THE PREFERRED EMBODIMENTS

To make the objectives, technical solutions and advantages of the present disclosure clearer, the present disclosure will be further described hereinbelow with reference to the attached drawings and embodiments thereof.

A method for processing a picture for an instant messenger according to embodiments of the present disclosure comprises the following steps of: obtaining related information of an edit area captured by the instant messenger, wherein the related information comprises at least an abscissa range and an ordinate range; and obtaining and recording position information of a cursor in real time after a start notification is received and before an end notification is received, and generating a line segment according to position information of a current cursor, the recorded position information of a previous cursor and the related information of the edit area.

In order to further improve a user's experience, the present disclosure specifically allows the user to process only a portion of the picture that is within the captured edit area during processing of the picture. The line segment may be generated within the edit area between the current cursor and the previous cursor according to the position information of the current cursor, the recorded position information of the previous cursor and the related information of the edit area.

According to the aforesaid embodiments of the present disclosure, position information of a current cursor is obtained in real time and a line segment is generated in real time so that the line segment generated between the current cursor and a previous cursor is substantially the same as the actual movement path of the cursor (i.e., the line drawn is substantially the same as the movement path of the cursor). Therefore, the user can edit a curve within the edit area through simple operations. This improves the user's operating efficiency and thus the usability of the instant messenger.

Hereinafter, the embodiments of the present disclosure will be described in detail with reference to the attached drawings.

Embodiment 1

Figure 1:
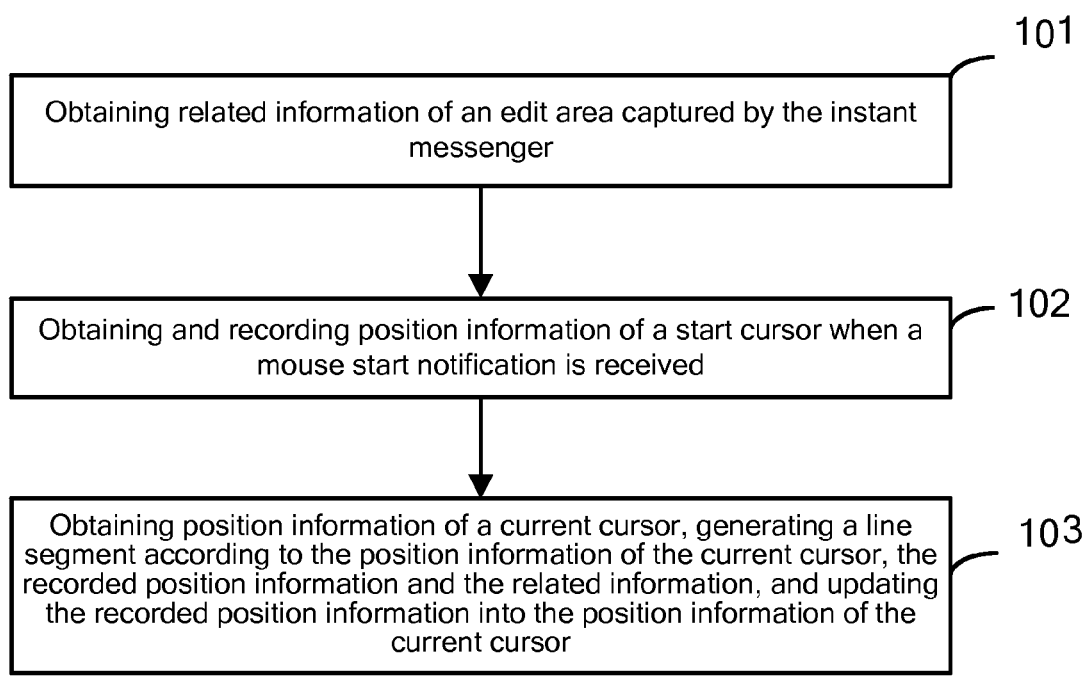
FIG. 1 is a flowchart diagram of a method for processing a picture for an instant messenger according to an embodiment 1 of the present disclosure.

As shown in FIG. 1, this embodiment of the present disclosure provides a method for processing a picture for an instant messenger and in particular a method executed by an edit function for an instant messenger, which comprises the following steps.

Step 101: obtaining related information of an edit area captured by the instant messenger, wherein the related information comprises at least an abscissa range and an ordinate range.

In this step, the user captures the edit area by using a screenshot function of the instant messenger.

Step 102: obtaining and recording position information of a start cursor when a start notification is received, wherein the position information comprises at least coordinates.

When the user presses down a main mouse button or presses a touch screen to edit the edit area, the edit function receives the start notification which is a message indicating that the main mouse button is pressed down or the touch screen is pressed.

Step 103: obtaining position information of a current cursor that comprises at least coordinates of the current cursor in real time before an end notification is received, generating a line segment according to the position information of the current cursor, the recorded position information and the related information of the edit area, and updating the recorded position information into the position information of the current cursor.

When the user releases the main mouse button or the touch screen after this edit operation is completed, the edit function receives the end notification which is a message indicating that the main mouse button or the touch screen is released.

Embodiment 2

After the user takes the edit area by using the screenshot function of the instant messenger and initiates the edit function, a method for processing a picture for an instant messenger according to this embodiment of the present disclosure is executed. In this embodiment, the position information of the cursor comprises coordinates of the cursor and a position relationship between the cursor and the edit area. Hereinafter, this embodiment will be described in detail with reference to FIG. 2.

Figure 2:
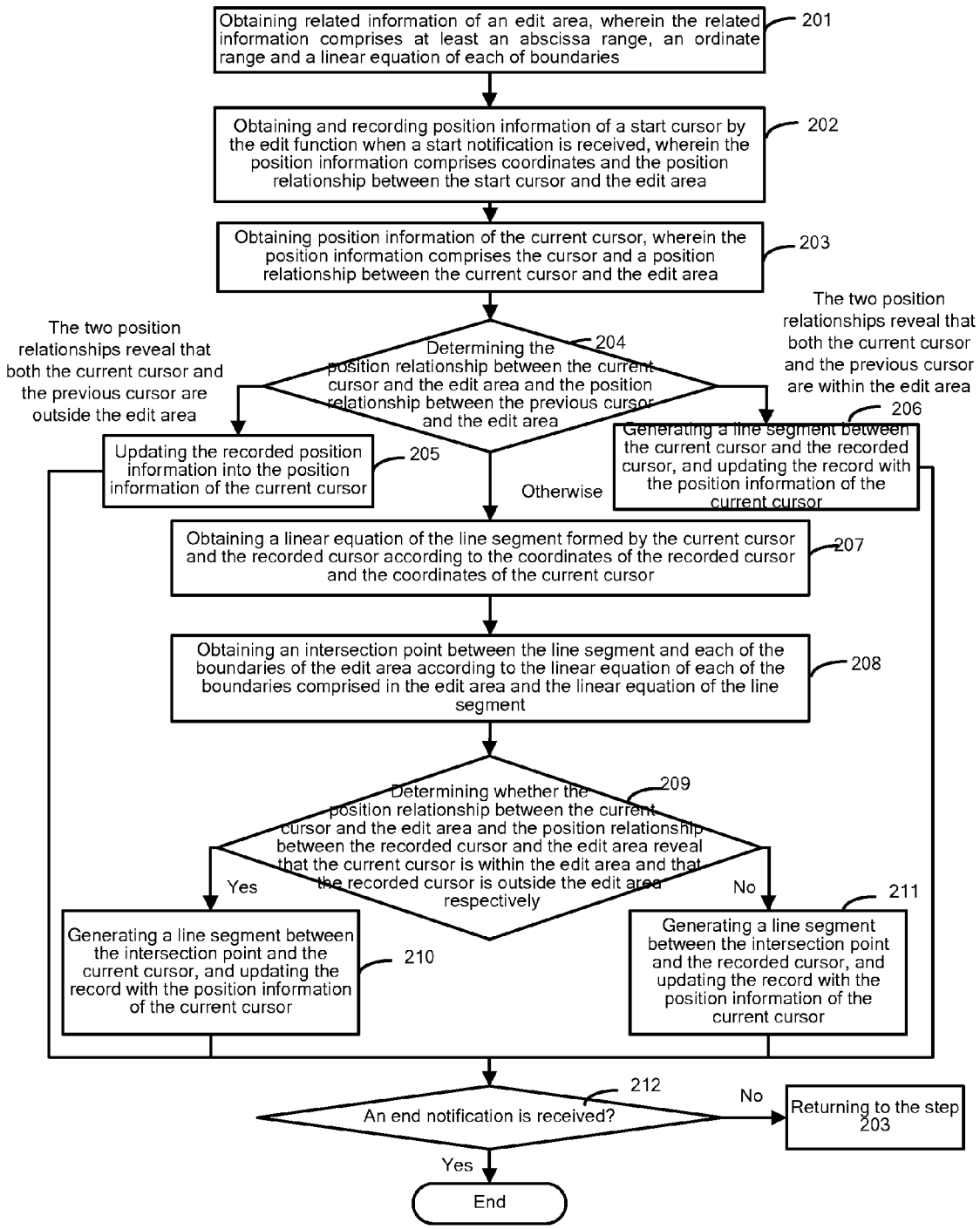
FIG. 2 is a flowchart diagram of a method for processing a picture for an instant messenger according to an embodiment 2 of the present disclosure.

As shown in FIG. 2, this embodiment of the present disclosure provides a method for processing a picture for an instant messenger, which comprises the following steps.

Step 201: obtaining by the edit function related information of an edit area captured by the screenshot function of the instant messenger, wherein the related information comprises at least an abscissa range and an ordinate range of the edit area and a linear equation of each of boundaries comprised in the edit area.

The edit area is of a rectangular structure and thus has two pairs of diagonal points, and each of the pairs comprises two diagonal points. Specifically, the edit function obtains coordinates $(X1, Y1)$ and $(X2, Y2)$ of two diagonal points comprised in one of the pairs of diagonal points respectively, and it is supposed that $X1<X2$ and $Y1>Y2$. According to the coordinates $(X1, Y1)$ and $(X2, Y2)$ of the diagonal points, the obtained related information of the edit area comprises the abscissa range $[X1, X2]$ and the ordinate range $[Y2, Y1]$.

Figure 3:
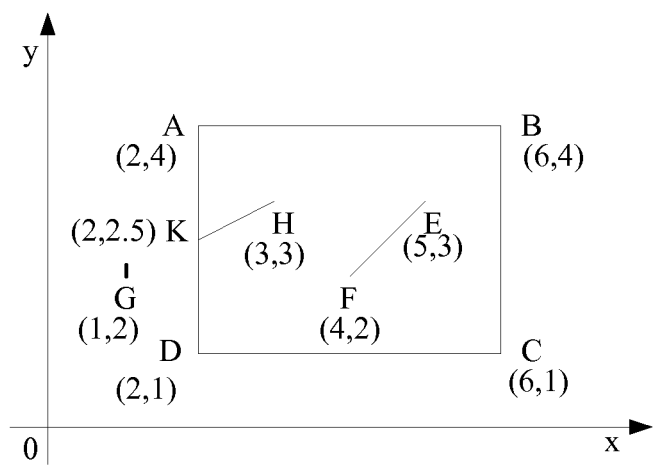
FIG. 3 is a schematic view of an edit area according to the embodiment 2 of the present disclosure.

For example, the edit area captured by the user using the screenshot function of the instant messenger is an edit area ABCD shown in FIG. 3. FIG. 3 is a schematic view of the edit area according to the embodiment 2 of the present disclosure. As shown in FIG. 3, the edit area comprises two pairs of diagonal points, one of the pairs comprises a diagonal point A and a diagonal point C, and the other of the pairs comprises a diagonal point B and a diagonal point D. The edit function obtains coordinates of two diagonal points comprised in one of the two pairs, and it is supposed that coordinates of the diagonal point A and the diagonal point C are obtained as (2, 4) and (6, 1) respectively. According to the coordinates (2, 4) of the diagonal point A and the coordinates (6, 1) of the diagonal point C, the obtained related information of the edit area ABCD comprises the abscissa range [2, 6] and the ordinate range [1, 4].

The edit function further decides a linear equation of each of the boundaries comprised in the edit area according to the abscissa range and the ordinate range of the edit area or according to the obtained coordinates of the two diagonal points. For example, according to the abscissa range [2, 6] and the ordinate range [1, 4] or according to the coordinates (2, 4) and (6, 1) of the two diagonal points, the linear equations of the boundaries of the edit area ABCD are decided as $x=2$, $x=6$, $y=1$ and $y=4$ respectively.

Step 202: obtaining and recording position information of a start cursor by the edit function when a start notification is received, wherein the position information comprises coordinates of the start cursor and a position relationship between the start cursor and the edit area.

In case a mouse is used, then the user presses down a main mouse button (e.g., a left mouse button) and starts to draw a line. When the main mouse button is pressed down, the edit function receives a message which is sent by an operation system indicating that the main mouse button is pressed down so as to notify the edit function to start editing. Then, the user moves the mouse, and the cursor moves following the mouse. The edit function monitors a MouseMove message that is sent by the operation system every other period, and this message comprises coordinates of a current cursor. In case a touch screen is used, then when the touch screen is pressed by the user, the edit function receives a message which is sent by the operation system indicating that the touch screen is pressed so as to notify the edit function to start editing. As the pressing position of the user moves, the cursor moves. The edit function monitors a MouseMove message that is sent by the operation system every other period, and this message comprises coordinates of a current cursor. In other words, after receiving the start notification sent by the user using such apparatuses as the mouse or the touch screen, the edit function starts to obtain the coordinates of the current cursor in real time. The period for the operation system to send the MouseMove message (i.e., the coordinates of the current cursor) is relatively short and usually lasts several milliseconds or shorter, so the edit function can obtain the coordinates of the current cursor in real time upon receiving the start notification.

This step will be described in detail by taking the mouse as an example. When the main mouse button is pressed down by the user, the edit function receives the start notification, and obtains the coordinates (X, Y) of the current cursor as the start cursor by monitoring the MouseMove message. Then, the edit function obtains the position relationship between the start cursor and the edit area according to the coordinates (X, Y) of the start cursor and some of the related information of the edit area, and records the coordinates (X, Y) of the start cursor and the position relationship between the start cursor and the edit area. For convenience of description, the coordinates of the cursor stored in the record are represented as (X', Y') in this embodiment.

Wherein, the step of obtaining the position relationship between the start cursor and the edit area comprises: determining whether the abscissa X and the ordinate Y of the start cursor are values within the abscissa range [X1, X2] and the ordinate range [Y2, Y1] of the edit area respectively; if the answer is "yes", then deciding that the position relationship between the start cursor and the edit area reveals that the cursor is within the edit area; otherwise, if the answer is "no", then deciding that the position relationship between the start cursor and the edit area reveals that the cursor is outside the edit area.

For example, suppose that the current cursor is a cursor E shown in FIG. 3 and coordinates of the cursor E are (5, 3). When the main mouse button is pressed down, the edit function starts to obtain the coordinates (5, 3) of the current cursor E as the start cursor upon receiving the start notification sent by the operation system; and then, the edit function determines whether the abscissa 5 and the ordinate 3 of the cursor E are values within the abscissa range [2, 6] and the ordinate range [1, 5] of the edit area ABCD respectively. Because it is determined that the abscissa 5 and the ordinate 3 of the cursor E are values within the abscissa range [2, 6] and the ordinate range [1, 4] respectively, it is obtained that the position relationship between the cursor E and the edit area ABCD reveals that the cursor is within the edit area. Then, the coordinates (5, 3) of the cursor E and the position relationship between the cursor E and the edit area ABCD which reveals that the cursor is within the edit area are recorded.

Step 203: obtaining position information of the current cursor by the edit function, wherein the position information of the current cursor comprises the coordinates of the current cursor and the position relationship between the current cursor and the edit area that is obtained according to the coordinates (X, Y) of the current cursor and some of the related information of the edit area.

Specifically, after the coordinates (X, Y) of the current cursor are obtained, the edit function determines whether the abscissa X and the ordinate Y of the current cursor are values within the abscissa range [X1, X2] and the ordinate range [Y2, Y1] of the edit area respectively. If the answer is "yes", then it is decided that the position relationship between the current cursor and the edit area reveals that the cursor is within the edit area; otherwise, if the answer is "no", then it is decided that the position relationship between the current cursor and the edit area reveals that the cursor is outside the edit area.

For example, supposing the coordinates of the current cursor obtained by the edit function at this time are coordinates (4, 2) of a current cursor F shown in FIG. 3, then it is determined that the abscissa 4 and the ordinate 2 of the current cursor F are values within the abscissa range [2, 6] and the ordinate range [1, 4] of the edit area ABCD respectively. Therefore, it is obtained that the position relationship between the current cursor F and the edit area ABCD reveals that the cursor is within the edit area.

Step 204: determining by the edit function the position relationship between the current cursor and the edit area and the position relationship between the recorded cursor and the edit area. If the position relationship between the current cursor and the edit area and the position relationship between the recorded cursor and the edit area reveal that both the current cursor and the recorded cursor are outside the edit area, then a step 205 is executed; if the position relationship between the current cursor and the edit area and the position relationship between the recorded cursor and the edit area reveal that both the current cursor and the recorded cursor are within the edit area, then a step 206 is executed; otherwise, a step 207 is executed.

Step 205: updating by the edit function the coordinates (X', Y') of the cursor stored in the record and the position relationship between this cursor and the edit area into the coordinates (X, Y) of the current cursor and the position relationship between the current cursor and the edit area respectively. Then, a step 212 is executed.

Step 206: generating a line segment between the current cursor and the cursor stored in the record and updating the coordinates (X', Y') of the cursor stored in the record and the position relationship between this cursor and the edit area into the coordinates (X, Y) of the current cursor and the position relationship between the current cursor and the edit area respectively by the edit function. Then, the step 212 is executed.

The period for sending the MouseMove message comprising the coordinates of the current cursor is relatively short, so the line segment generated between the cursor stored in the record and the current cursor is substantially the same as the actual movement path of the cursor.

For example, in the step 204, the edit function determines that the position relationship between the current cursor F and the edit area ABCD and the position relationship between the recorded cursor E and the edit area ABCD reveal that both the current cursor F and the recorded cursor E are within the edit area. Therefore, step 206 is executed to generate a line segment between the current cursor F and the recorded cursor E and update the coordinates of the cursor E stored in the record and the position relationship between the cursor E and the edit area ABCD into the coordinates (4, 2) of the current cursor F and the position relationship between the current cursor F and the edit area ABCD respectively.

Step 207: obtaining by the edit function a linear equation of the line segment formed by the recorded cursor and the current cursor according to the coordinates (X, Y) of the current cursor and the coordinates (X', Y') of the recorded cursor.

Specifically, according to the coordinates (X, Y) of the current cursor and the coordinates (X', Y') of the recorded cursor, a slope $$k = \frac{Y' - Y}{X' - X}$$

and an intercept $$b = \frac{X'Y - XY'}{X' - X}$$

are calculated; and then, the slope k and the intercept b are combined to form a linear equation y=kx+b, which is the linear equation of the line segment formed by the current cursor and the recorded cursor.

For example, supposing that the coordinates of the cursor stored in the record are coordinates (1, 2) of a cursor G shown in FIG. 3 and a position relationship between the cursor G and the edit area ABCD reveals that the cursor is outside the edit area, and that the current cursor is a cursor H whose coordinates are (3, 3) and a position relationship between the current cursor H and the edit area reveals that the cursor is within the edit area, then step 207 is executed by the edit function to obtain the linear equation y=0.5x+1.5 of the line segment GH according to the coordinates (1, 2) of the recorded cursor G and the coordinates (3, 3) of the current cursor H.

Step 208: obtaining by the edit function an intersection point between the line segment formed by the current cursor and the recorded cursor and each of the boundaries of the edit area according to the linear equation of each of the boundaries comprised in the edit area and the linear equation of the line segment.

Specifically, the edit function combines the linear equation of each of the boundaries of the edit area and the linear equation of the line segment into an equation set, calculates each of the equation sets to obtain coordinates of an intersection point between a straight line in which the line segment lies and a straight line in which each of the boundaries of the edit area lies, and then selects an intersection point at which the line segment intersects one of the boundaries of the edit area according to the coordinates of each of the intersection points.

The intersection point at which the line segment intersects one of the boundaries of the edit area shall be located in the line segment. A abscissa of each of the points in this line segment is a value between the abscissa X' of the recorded cursor and the abscissa X of the current cursor, and a ordinate of each of the points in this line segment is a value between the ordinate Y' of the recorded cursor and the ordinate Y of the current cursor. Therefore, the aforesaid step of selecting an intersection point at which the line segment intersects one of the boundaries of the edit area according to the coordinates of each of the intersection points comprises: from the intersection points, selecting an intersection point whose abscissa is a value between the abscissa X' of the recorded cursor and the abscissa X of the current cursor and whose ordinate is a value between the ordinate Y' of the recorded cursor and the ordinate Y of the current cursor.

For example, the linear equations x=2, x=6, y=1 and y=4 of the boundaries of the edit area ABCD are combined with the linear equation y=0.5x+1.5 of the line segment GH respectively to form four equation sets. Then, the equation sets are calculated to obtain coordinates (2, 2.5), (6, 4.5), (−1, 1) and (5, 4) of four intersection points respectively. The intersection point (2, 2.5) whose abscissa is a value within [1, 3] and whose ordinate is a value within [2, 3] is selected from the four intersection points. For convenience of description, the selected intersection point is represented by K; i.e., the intersection point K is the intersection point at which the line segment GH intersects one of the boundaries of the edit area ABCD.

Furthermore, preferably, the operation of deciding a linear equation of each of the boundaries of the edit area may be omitted in the step 201 but instead executed in the step 208.

Step 209: determining the position relationship between the current cursor and the edit area and the position relationship between the recorded cursor and the edit area. If the position relationship between the current cursor and the edit area and the position relationship between the recorded cursor and the edit area reveal that the current cursor is within the edit area and that the recorded cursor is outside the edit area respectively, then a step 210 is executed; and if the position relationship between the current cursor and the edit area and the position relationship between the recorded cursor and the edit area reveal that the current cursor is outside the edit area and that the recorded cursor is within the edit area respectively, then a step 211 is executed.

For example, the edit function determines that the position relationship between the current cursor H and the edit area and the position relationship between the recorded cursor G and the edit area reveal that the current cursor H is within the edit area and that the recorded cursor G is outside the edit area respectively, so the step 210 is executed.

Step 210: generating a line segment between the intersection point and the current cursor and updating the coordinates (X', Y') of the cursor stored in the record and the position relationship between this cursor and the edit area into the coordinates (X, Y) of the current cursor and the position relationship between the current cursor and the edit area respectively by the edit function. Then, a step 212 is executed.

For example, a line segment is generated between the intersection point K and the current cursor H, and then the coordinates of the cursor G stored in the record and the position relationship between the cursor G and the edit area ABCD are updated into the coordinates (3, 3) of the current cursor F and the position relationship between the current cursor F and the edit area ABCD which reveals that the cursor is within the edit area respectively.

Step 211: generating a line segment between the intersection point and the recorded cursor and updating the coordinates (X', Y') of the cursor stored in the record and the position relationship between this cursor and the edit area into the coordinates (X, Y) of the current cursor and the position relationship between the current cursor and the edit area respectively by the edit function. Then, the step 212 is executed.

The line segments are generated only between the intersection point and the cursors that are within the edit area in the steps 210 and 211, so it is possible to draw only the line within the edit area (i.e., it is possible to edit only the picture captured by the screenshot function).

Step 212: determining by the edit function whether an end notification is received; if the answer is "yes", then ending the operation; otherwise, if the answer is "no", then returning to the step 203.

When the user releases such apparatuses as the main mouse button or the touch screen, the edit function monitors a message which is sent by the operation system indicating that the main mouse button or the touch screen is released so as to notify the edit function to end editing, so the operation is ended.

When the user needs to edit the taken picture for multiple times, the aforesaid steps 202 to 212 may be executed repeatedly until the edit task is completed and the edit function is quitted by the user.

Furthermore, in this embodiment, the edit function may also firstly determine whether the coordinates (X, Y) of the current cursor are the same as the coordinates (X', Y') of the recorded cursor after obtaining the coordinates of the current cursor. If the coordinates (X, Y) of the current cursor are different from the coordinates (X', Y') of the recorded cursor, then other operations are performed; otherwise, if the coordinates (X, Y) of the current cursor are the same as the coordinates (X', Y') of the recorded cursor, then the coordinates of the current cursor are continuously obtained rather than performing any other operation.

In addition, the user may further set the width and the color of the line after the edit function is initiated. When generating a line segment, the edit function sets the generated line segment to be of the width and the color of the line that are set by the user.

Because the line segment generated in each period is similar to the movement path of the cursor, the line drawn by the user is very similar to the actual movement path of the cursor. Therefore, the line drawn is substantially the same as the actual movement path of the cursor.

In this embodiment, when the edit area is captured by the user using the screenshot function of the instant messenger, a picture within the edit area is stored in an internal memory. Whenever a line segment is drawn by the edit function, the picture within the whole edit area is stored in the internal memory. When the user is to withdraw the line drawn, the corresponding picture can be read directly from the internal memory.

In this embodiment of the present disclosure, the related information of the edit area captured by the screenshot tool of the instant messenger is obtained; the position information of the start cursor is obtained and recorded when a signal indicating that the mouse is pressed down is received; and when the coordinates of the current cursor are obtained again, a line segment is generated according to the position information of the current cursor, the recorded position information and the related information of the edit area. The edit function monitors in real time the coordinates of the current cursor sent by the operation system every other period and this period is relatively short, so the line segment generated in each period is very similar to the actual movement path of the cursor. Therefore, the line drawn is substantially the same as the movement path of the cursor.

Embodiment 3

In this embodiment, the position information of the cursor comprises only the coordinates of the cursor but does not comprise the position relationship between the cursor and the edit area. For purpose of concision, steps in this embodiment that are the same as those in the embodiment 2 will not be further described hereinafter.

Figure 4:
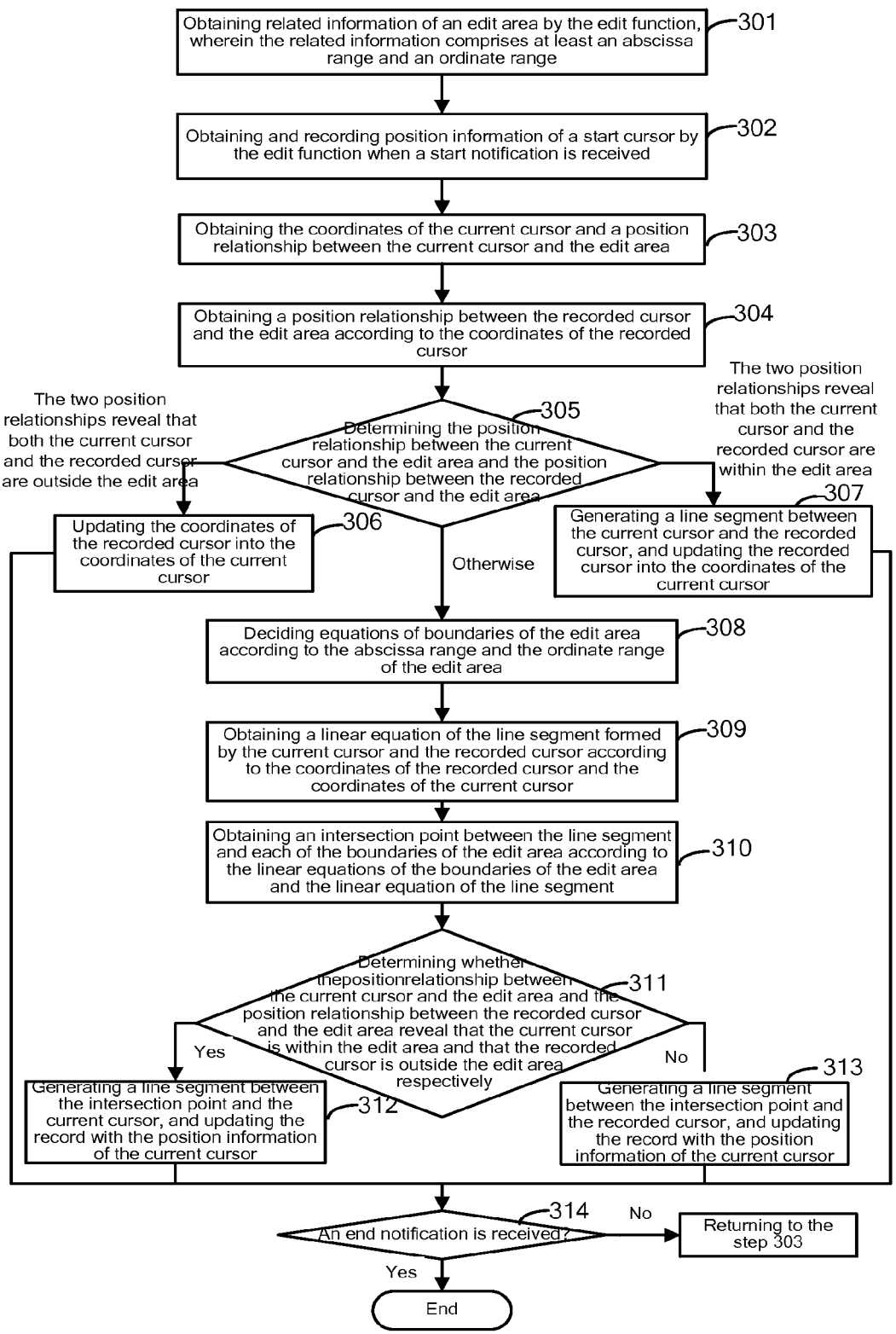
FIG. 4 is a flowchart diagram of a method for processing a picture for an instant messenger according to an embodiment 3 of the present disclosure.

As shown in FIG. 4, this embodiment of the present disclosure provides a method for processing a picture for an instant messenger, which comprises the following steps.

Step 301: obtaining by the edit function related information of an edit area captured by the screenshot function of the instant messenger, wherein the related information comprises at least an abscissa range and an ordinate range of the edit area.

Step 302: when a start notification is received, obtaining and recording position information of a start cursor by the edit function; i.e., obtaining and recording coordinates (X, Y) of a current cursor as the start cursor by the edit function.

Likewise, the coordinates of the recorded cursor are represented as (X', Y') for convenience of description.

Step 303: obtaining position information of the current cursor that comprises the coordinates (X, Y) of the current cursor and obtaining a position relationship between the current cursor and the edit area according to the coordinates of the current cursor by the edit function.

The step of obtaining a position relationship between the current cursor and the edit area is the same as the step 203 in the embodiment 2, and thus will not be further described herein.

Step 304: obtaining by the edit function a position relationship between the recorded cursor and the edit area according to the coordinates of the recorded cursor.

Step 305: determining by the edit function the position relationship between the current cursor and the edit area and the position relationship between the recorded cursor and the edit area. If the position relationship between the current cursor and the edit area and the position relationship between the recorded cursor and the edit area reveal that both the current cursor and the recorded cursor are outside the edit area, then a step 306 is executed; if the position relationship between the current cursor and the edit area and the position relationship between the recorded cursor and the edit area reveal that both the current cursor and the recorded cursor are within the edit area, then a step 307 is executed; otherwise, if the position relationship between the current cursor and the edit area is different from the position relationship between the recorded cursor and the edit area, then a step 308 is executed.

Step 306: updating by the edit function the coordinates of the recorded cursor into the coordinates of the current cursor. Then, a step 314 is executed.

Step 307: generating a line segment between the recorded cursor and the current cursor and updating the coordinates of the recorded cursor into the coordinates of the current cursor by the edit function. Then, the step 314 is executed.

Step 308: deciding by the edit function linear equations (e.g., $x=X1$, $x=X2$, $y=Y1$ and $y=Y2$) of boundaries comprised in the edit area according to the abscissa range [X1, X1] and the ordinate range [Y2, Y1] of the edit area.

Step 309: obtaining by the edit function a linear equation of the line segment formed by the recorded cursor and the current cursor according to the recorded cursor (X', Y') and the coordinates (X, Y) of the current cursor.

The step of obtaining a linear equation of the line segment is the same as the step 207 in the embodiment 2, and thus will not be further described herein.

Step 310: obtaining by the edit function an intersection point between the line segment and each of the boundaries of the edit area according to the linear equation of the line segment and the linear equations of the boundaries comprised in the edit area.

The step of obtaining an intersection point between the line segment and each of the boundaries of the edit area is the same as the step 208 in the embodiment 2, and thus will not be further described herein.

Step 311: determining by the edit function the position relationship between the current cursor and the edit area and the position relationship between the recorded cursor and the edit area. If the position relationship between the current cursor and the edit area and the position relationship between the recorded cursor and the edit area reveal that the current cursor is within the edit area and that the recorded cursor is outside the edit area respectively, then a step 312 is executed;

and if the position relationship between the current cursor and the edit area and the position relationship between the recorded cursor and the edit area reveal that the current cursor is outside the edit area and that the recorded cursor is within the edit area respectively, then a step 313 is executed.

Step 312: generating a line segment between the current cursor and the intersection point and updating the coordinates of the recorded cursor into the coordinates of the current cursor by the edit function. Then, the step 314 is executed.

Step 313: generating a line segment between the recorded cursor and the intersection point and updating the coordinates of the recorded cursor into the coordinates of the current cursor by the edit function. Then, the step 314 is executed.

Step 314: determining by the edit function whether an end notification is received; if the answer is "yes", then ending the operation; otherwise, if the answer is "no", then returning to the step 303.

When the user needs to edit the taken picture for multiple times, the aforesaid steps 302 to 314 may be executed repeatedly until the edit task is completed and the edit function is quitted by the user.

In this embodiment, when updating the coordinates of the start cursor stored in the record into the coordinates of the current cursor, the edit function may further record the position relationship between the current cursor and the edit area; and then, whenever the record is updated again, the coordinates of the recorded cursor and the position relationship between the recorded cursor and the edit area are updated into the coordinates of the current cursor and the position relationship between the current cursor and the edit area respectively, and the step 304 is not executed any more.

In this embodiment of the present disclosure, the related information of the edit area captured by the screenshot function of the instant messenger is obtained; the coordinates of the start cursor is obtained and recorded when the start notification is received; and when the coordinates of the current cursor are obtained again, a line segment is generated according to the coordinates of the current cursor, the recorded coordinates and the related information of the edit area. The edit function monitors in real time the coordinates of the current cursor sent by the operation system every other period and this period is relatively short, so the line segment generated in each period is very similar to the actual movement path of the cursor. Therefore, the line drawn is substantially the same as the movement path of the cursor.

Embodiment 4

Figure 5:
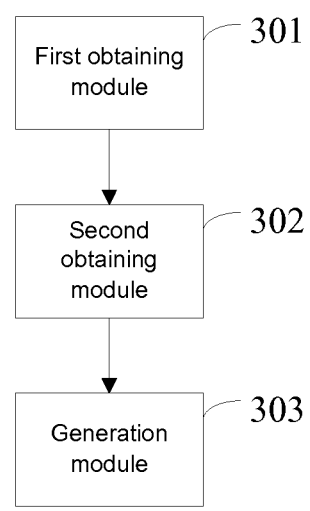
FIG. 5 is a schematic view of an apparatus for processing a picture for an instant messenger according to an embodiment 4 of the present disclosure.

As shown in FIG. 5, this embodiment of the present disclosure provides an apparatus for processing a picture for an instant messenger, which comprises: a first obtaining module 301, being configured to obtain related information of an edit area, wherein the related information comprises at least an abscissa range and an ordinate range; a second obtaining module 302, being configured to obtain and record position information of a cursor in real time after a start notification is received and before an end notification is received; and a generation module 303, being configured to generate a line segment according to position information of a current cursor and the recorded position information of a previous cursor that are obtained by the second obtaining module 302 and the related information of the edit area obtained by the first obtaining module 301.

In order to further improve a user's experience, specifically the present disclosure allows the user to process only a portion of the picture that is within the captured edit area during processing of the picture. The generation module 303 is configured to generate the line segment within the edit area between the current cursor and the previous cursor according to the position information of the current cursor and the recorded position information of the previous cursor that are obtained by the second obtaining module 302 and the related information of the edit area obtained by the first obtaining module 301.

Specifically, the generation module 303 may comprise a determination unit and a generation unit. The determination unit is configured to, when determining that both the current cursor and the previous cursor are within the edit area according to the position information of the current cursor and the recorded position information of the previous cursor that are obtained by the second obtaining module 302 and the related information of the edit area obtained by the first obtaining module 301, send to the generation unit first information of generating a line segment between the current cursor and the previous cursor. The generation unit is configured to generate a line segment between the current cursor and the previous cursor according to the first information.

The generation module 303 may further comprise a deciding unit. The determination unit is further configured to, when determining that one of the current cursor and the previous cursor is within the edit area and the other of the current cursor and the previous cursor is outside the edit area, send to the deciding unit second information of deciding an intersection point between the line segment formed by the previous cursor and the current cursor and one of boundaries of the edit area. The deciding unit is configured to decide an intersection point between the line segment formed by the previous cursor and the current cursor and one of the boundaries of the edit area according to the second information. The generation unit is further configured to generate a line segment between the intersection point decided by the deciding unit and the cursor that is within the edit area according to the intersection point.

In another embodiment of the present disclosure, the second obtaining module 302 is configured to: obtain and record position information of a start cursor that comprises at least coordinates when the start notice is received and obtain position information of the current cursor in real time before the end notice is received. The generation module 303 is configured to generate a line segment according to the position information of the current cursor, the recorded position information and the related information of the edit area, and update the recorded position information into the position information of the current cursor.

Wherein, the first obtaining module 301 specifically comprises: a first obtaining unit, being configured to obtain coordinates of two diagonal points comprised in any pair of diagonal points of the edit area; and a second obtaining unit, being configured to obtain the abscissa range, the ordinate range and a linear equation of each of the boundaries of the edit area according to the coordinates of the two diagonal points.

Wherein, the generation module 303 specifically comprises: a first determination unit, being configured to determine a position relationship between the start cursor and the edit area according to coordinates of the start cursor and the related information; a second determination unit, being configured to determine a position relationship between the current cursor and the edit area according to coordinates of the current cursor and the related information; a first generation unit, being configured to generate a line segment between the recorded cursor and the current cursor when the position relationship between the current cursor and the edit area and the position relationship between the recorded cursor and the edit area reveal that both the current cursor and the recorded cursor are within the edit area; a first deciding unit, being configured to decide a linear equation of each of the boundaries comprised in the edit area according to the related information when the position relationship between the current cursor and the edit area is different from the position relationship between the recorded cursor and the edit area; a third obtaining unit, being configured to obtain an intersection point between the line segment formed by the recorded cursor and the current cursor and each of the boundaries of the edit area according to the coordinates of the current cursor, the coordinates of the recorded cursor and the linear equation of each of the boundaries; a second generation unit, being configured to generate a line segment between the intersection point and the recorded cursor if the position relationship between the current cursor and the edit area and the position relationship between the recorded cursor and the edit area reveal that the current cursor is outside the edit area and that the recorded cursor is within the edit area respectively; a third generation unit, being configured to generate a line segment between the intersection point and the current cursor if the position relationship between the current cursor and the edit area and the position relationship between the recorded cursor and the edit area reveal that the current cursor is within the edit area and that the recorded cursor is outside the edit area respectively; and a first updating unit, being configured to update the recorded position information into the position information of the current cursor.

Wherein, the third obtaining unit specifically comprises: a first obtaining sub-unit, being configured to obtain a linear equation of the formed line segment according to the coordinates of the current cursor and the coordinates of the recorded cursor; a second obtaining sub-unit, being configured to combine the linear equation of the formed line segment and the linear equation of each of the boundaries into an equation set, and calculate each of the equation sets to obtain coordinates of an intersection point between a straight line in which the formed line segment lies and a straight line in which each of the boundaries lies; and a selecting sub-unit, being configured to select an intersection point that is located in the formed line segment according to the coordinates of the recorded cursor, the coordinates of the current cursor and the coordinates of each of the intersection points, wherein the selected intersection point is an intersection point at which the formed line segment intersects one of the boundaries of the edit area.

In a further embodiment of the present disclosure, the position information of the start cursor further comprises the position relationship between the start cursor and the edit area. Correspondingly, the second obtaining module 302 comprises: a first receiving unit, being configured to receive the coordinates of the start cursor; a third determination unit, being configured to determine whether the abscissa and the ordinate of the start cursor are values within the abscissa range and the ordinate range of the edit area respectively, wherein if the answer is "yes", then the position relationship between the start cursor and the edit area reveals that the cursor is within the edit area; otherwise, if the answer is "no", then the position relationship between the start cursor and the edit area reveals that the cursor is outside the edit area; and a recording unit, being configured to record the position information of the start cursor.

The position information of the current cursor further comprises the position relationship between the current cursor and the edit area. Correspondingly, the second obtaining module 302 further comprises: a second receiving unit, being configured to receive the coordinates of the current cursor; and a fourth determination unit, being configured to determine whether the abscissa and the ordinate of the current cursor are values within the abscissa range and the ordinate range of the edit area respectively, wherein if the answer is "yes", then the position relationship between the current cursor and the edit area reveals that the cursor is within the edit area; otherwise, if the answer is "no", then the position relationship between the current cursor and the edit area reveals that the cursor is outside the edit area.

The generation module 303 specifically comprises: a fourth generation unit, being configured to generate a line segment between the recorded cursor and the current cursor when the position relationship between the current cursor and the edit area and the position relationship between the recorded cursor and the edit area reveal that both the current cursor and the recorded cursor are within the edit area; a fourth obtaining unit, being configured to obtain an intersection point between the line segment formed by the recorded cursor and the current cursor and each of the boundaries of the edit area according to the coordinates of the current cursor, the coordinates of the recorded cursor and the linear equation of each of the boundaries when the position relationship between the current cursor and the edit area is different from the position relationship between the recorded cursor and the edit area; a fifth generation unit, being configured to generate a line segment between the intersection point and the recorded cursor if the position relationship between the current cursor and the edit area and the position relationship between the recorded cursor and the edit area reveal that the current cursor is outside the edit area and that the recorded cursor is within the edit area respectively; a sixth generation unit, being configured to generate a line segment between the intersection point and the current cursor if the position relationship between the current cursor and the edit area and the position relationship between the recorded cursor and the edit area reveal that the current cursor is within the edit area and that the recorded cursor is outside the edit area respectively; and a second updating unit, being configured to update the recorded position information into the position information of the current cursor.

Wherein, the apparatus for processing the picture is the edit function in the instant messenger.

According to the aforesaid embodiments of the present disclosure, position information of a current cursor is obtained in real time and a line segment is generated in real time so that the line segment generated between the current cursor and a previous cursor is substantially the same as the actual movement path of the cursor (i.e., the line drawn is substantially the same as the movement path of the cursor). Therefore, the user can edit a curve within the edit area through simple operations. This improves the user's operating efficiency and thus the usability of the instant messenger.

All or some of the contents in the technical solutions according to the aforesaid embodiments may be accomplished through software programming. Software programs are stored in a readable storage medium such as a hard disk, a compact disk (CD) or a floppy disk in a computer.

What described above are only preferred embodiments of the present disclosure but are not intended to limit the scope of the present disclosure. Accordingly, any modifications, equivalent substitutions or improvements that are made on basis of the spirit and principles of the present disclosure shall all fall within the scope of the present disclosure.

What is claimed is:

1. A method for processing a picture for an instant messenger, wherein the method comprises the following steps of:

obtaining related information of an edit area captured by the instant messenger, wherein the related information comprises at least an abscissa range and an ordinate range;

obtaining and recording position information including at least coordinates of a start cursor in real time after a start notification is received and before an end notification is received;

obtaining position information of a current cursor in real time before the end notification is received;

generating a line segment according to position information of current cursor, the recorded position information of a previous cursor and the related information of the edit area; and updating the recorded position information into the position information of the current cursor, wherein the step of generating the line segment comprises the steps of:

determining a position relationship between the start cursor and the edit area according to coordinates of the start cursor and the related information;

determining a position relationship between the current cursor and the edit area according to coordinates of the current cursor and the related information;

if the position relationship between the current cursor and the edit area and the position relationship between the recorded cursor and the edit area reveal that both the current cursor and the recorded cursor are within the edit area, then generating a line segment between the recorded cursor and the current cursor;

if the position relationship between the current cursor and the edit area is different from the position relationship between the recorded cursor and the edit area, then deciding a linear equation of each of the boundaries comprised in the edit area according to the related information;

obtaining an intersection point between the line segment formed by the recorded cursor and the current cursor and each of the boundaries of the edit area according to the coordinates of the current cursor, the coordinates of the recorded cursor and the linear equation of each of the boundaries;

if the position relationship between the current cursor and the edit area and the position relationship between the recorded cursor and the edit area reveal that the current cursor is outside the edit area and that the recorded cursor is within the edit area respectively, then generating a line segment between the intersection point and the recorded cursor; and if the position relationship between the current cursor and the edit area and the position relationship between the recorded cursor and the edit area reveal that the current cursor is within the edit area and that the recorded cursor is outside the edit area respectively, then generating a line segment between the intersection point and the current cursor.

2. The method of claim 1, wherein the position information of the start cursor further comprises the position relationship between the start cursor and the edit area, and correspondingly, the step of obtaining position information of a start cursor specifically comprises:

receiving the coordinates of the start cursor; and determining whether the abscissa and the ordinate of the start cursor are values within the abscissa range and the ordinate range respectively, wherein:

if the answer is "yes", then the position relationship between the start cursor and the edit area reveals that the cursor is within the edit area; otherwise, if the answer is "no", then the position relationship between the start cursor and the edit area reveals that the cursor is outside the edit area.

3. The method of claim 2, wherein the position information of the current cursor further comprises the position relationship between the current cursor and the edit area, and correspondingly, the step of obtaining position information of a current cursor in real time specifically comprises:

receiving the coordinates of the current cursor in real time; and determining whether the abscissa and the ordinate of the current cursor are values within the abscissa range and the ordinate range respectively, wherein:

if the answer is "yes", then the position relationship between the current cursor and the edit area reveals that the cursor is within the edit area; otherwise, if the answer is "no", then the position relationship between the current cursor and the edit area reveals that the cursor is outside the edit area.

4. The method of claim 3, wherein the step of generating a line segment according to the position information of the current cursor, the recorded position information and the related information comprises:

if the position relationship between the current cursor and the edit area and the position relationship between the recorded cursor and the edit area reveal that both the current cursor and the recorded cursor are within the edit area, then generating a line segment between the recorded cursor and the current cursor;

if the position relationship between the current cursor and the edit area is different from the position relationship between the recorded cursor and the edit area, then deciding a linear equation of each of the boundaries comprised in the edit area according to the related information;

obtaining an intersection point between the line segment formed by the recorded cursor and the current cursor and each of the boundaries of the edit area according to the coordinates of the current cursor, the coordinates of the recorded cursor and the linear equation of each of the boundaries;

if the position relationship between the current cursor and the edit area and the position relationship between the recorded cursor and the edit area reveal that the current cursor is outside the edit area and that the recorded cursor is within the edit area respectively, then generating a line segment between the intersection point and the recorded cursor; and if the position relationship between the current cursor and the edit area and the position relationship between the recorded cursor and the edit area reveal that the current cursor is within the edit area and that the recorded cursor is outside the edit area respectively, then generating a line segment between the intersection point and the current cursor.

5. The method of claim 1, wherein if it is determined that both the current cursor and the previous cursor are within the edit area according to the position information of the current cursor, the recorded position information of the previous cursor and the related information of the edit area, then the line segment is generated between the current cursor and the previous cursor.

6. The method of claim 1, wherein if it is determined that one of the current cursor and the previous cursor is within the edit area and the other is outside the edit area according to the position information of the current cursor, the recorded position information of the previous cursor and the related information of the edit area, then an intersection point between the line segment formed by the previous cursor and the current cursor and one of boundaries of the edit area is decided and, a line segment is generated between the intersection point and the cursor that is within the edit area.

7. The method of claim 1, wherein the step of obtaining related information of an edit area specifically comprises:

obtaining coordinates of two diagonal points comprised in any pair of diagonal points of the edit area; and obtaining the abscissa range and the ordinate range of the edit area according to the coordinates of the two diagonal points.

8. The method of claim 1, wherein the step of obtaining an intersection point between the line segment formed by the recorded cursor and the current cursor and each of the boundaries of the edit area according to the coordinates of the current cursor, the coordinates of the recorded cursor and the linear equation of each of the boundaries specifically comprises:

obtaining a linear equation of the formed line segment according to the coordinates of the current cursor and the coordinates of the recorded cursor;

combining the linear equation of the formed line segment and the linear equation of each of the boundaries into an equation set, and calculating each of the equation sets to obtain coordinates of an intersection point between a straight line in which the formed line segment lies and a straight line in which each of the boundaries lies; and selecting an intersection point that is located in the formed line segment according to the coordinates of the recorded cursor, the coordinates of the current cursor and the coordinates of each of the intersection points, wherein the selected intersection point is an intersection point at which the formed line segment intersects one of the boundaries of the edit area.

9. An apparatus for processing a picture for an instant messenger, comprising:

a display on which a cursor is displayed under control of a computing device, said computing device executing the following modules:

a first obtaining module, configured to obtain related information of an edit area, wherein the related information comprises at least an abscissa range and an ordinate range;

a second obtaining module, configured to obtain and record position information including at least coordinates of a start cursor in real time after a start notification is received and before an end notification is received; and a generation module, configured to generate a line segment for display on the display according to position information of a current cursor and the recorded position information of a previous cursor that are obtained by the second obtaining module and the related information of the edit area obtained by the first obtaining module, wherein the generation module comprises:

a first determination unit, configured to determine a position relationship between the start cursor and the edit area according to coordinates of the start cursor and the related information;

a second determination unit, configured to determine a position relationship between the current cursor and the edit area according to coordinates of the current cursor and the related information;

a first generation unit, configured to generate a line segment between the recorded cursor and the current cursor when the position relationship between the current cursor and the edit area and the position relationship between the recorded cursor and the edit area reveal that both the current cursor and the recorded cursor are within the edit area;

a first deciding unit, configured to decide a linear equation of each of the boundaries comprised in the edit area according to the related information when the position relationship between the current cursor and the edit area is different from the position relationship between the recorded cursor and the edit area;

a third obtaining unit, configured to obtain an intersection point between the line segment formed by the recorded cursor and the current cursor and each of the boundaries of the edit area according to the coordinates of the current cursor, the coordinates of the recorded cursor and the linear equation of each of the boundaries;

a second generation unit, configured to generate a line segment between the intersection point and the recorded cursor if the position relationship between the current cursor and the edit area and the position relationship between the recorded cursor and the edit area reveal that the current cursor is outside the edit area and that the recorded cursor is within the edit area respectively;

a third generation unit, configured to generate a line segment between the intersection point and the current cursor if the position relationship between the current cursor and the edit area and the position relationship between the recorded cursor and the edit area reveal that the current cursor is within the edit area and that the recorded cursor is outside the edit area respectively; and a first updating unit, configured to update the recorded position information into the position information of the current cursor.

10. The apparatus of claim 9, wherein the position information of the current cursor and the recorded position information of the previous cursor are obtained by the second obtaining module, and the related information of the edit area are obtained by the first obtaining module.

11. The apparatus of claim 10, wherein the generation module comprises a determination unit and a generation unit, the determination unit is configured to, when determining that both the current cursor and the previous cursor are within the edit area according to the position information of the current cursor, the recorded position information of the previous cursor and the related information of the edit area, send to the generation unit first information of generating a line segment between the current cursor and the previous cursor, wherein the position information of the current cursor and the recorded position information of the previous cursor are obtained by the second obtaining module and the related information of the edit area are obtained by the first obtaining module; and the generation unit is configured to generate a line segment between the current cursor and the previous cursor according to the first information.

12. The apparatus of claim 11, wherein the generation module further comprises a deciding unit, the determination unit is further configured to, when determining that one of the current cursor and the previous cursor is within the edit area and the other is outside the edit area, send to the deciding unit second information of deciding an intersection point between the line segment formed by the previous cursor and the current cursor and one of boundaries of the edit area;

the deciding unit is configured to decide an intersection point between the line segment formed by the previous cursor and the current cursor and one of the boundaries of the edit area according to the second information; and the generation unit is further configured to generate a line segment between the intersection point decided by the deciding unit and the cursor that is within the edit area according to the intersection point.

13. The apparatus of claim 9, wherein the position information of the start cursor further comprises the position relationship between the start cursor and the edit area, and correspondingly, the second obtaining module comprises:
   a first receiving unit, configured to receive the coordinates of the start cursor;
   a third determination unit, configured to determine whether the abscissa and the ordinate of the start cursor are values within the abscissa range and the ordinate range respectively, wherein if the answer is "yes", then the position relationship between the start cursor and the edit area reveals that the cursor is within the edit area; otherwise, if the answer is "no", then the position relationship between the start cursor and the edit area reveals that the cursor is outside the edit area; and
   a recording unit, configured to record the position information.

14. The apparatus of claim 13, wherein the position information of the current cursor further comprises the position relationship between the current cursor and the edit area, and correspondingly, the second obtaining module further comprises:
   a second receiving unit, configured to receive the coordinates of the current cursor; and
   a fourth determination unit, configured to determine whether the abscissa and the ordinate of the current cursor are values within the abscissa range and the ordinate range respectively, wherein:
   if the answer is "yes", then the position relationship between the current cursor and the edit area reveals that the cursor is within the edit area; otherwise, if the answer is "no", then the position relationship between the current cursor and the edit area reveals that the cursor is outside the edit area.

15. The apparatus of claim 9, wherein the third obtaining unit comprises:
   a first obtaining sub-unit, configured to obtain a linear equation of the formed line segment according to the coordinates of the current cursor and the coordinates of the recorded cursor;
   a second obtaining sub-unit, configured to combine the linear equation of the formed line segment and the linear equation of each of the boundaries into an equation set, and calculate each of the equation sets to obtain coordinates of an intersection point between a straight line in which the formed line segment lies and a straight line in which each of the boundaries lies; and
   a selecting sub-unit, configured to select an intersection point that is located in the formed line segment according to the coordinates of the recorded cursor, the coordinates of the current cursor and the coordinates of each of the intersection points, wherein the selected intersection point is an intersection point at which the formed line segment intersects one of the boundaries of the edit area.

* * * * *